No. 755,658. PATENTED MAR. 29, 1904.
S. HARTMAN.
HOOK FOR SUPPORTING TENTING CLOTH.
APPLICATION FILED APR. 7, 1903.
NO MODEL.
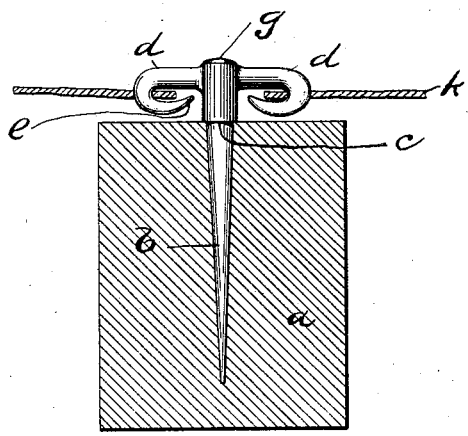
Witnesses
Frank G. Campbell
D. Kimmendahl
Inventor
Samuel Hartman
J. N. E. Hart
His Attorney No. 755,658. Patented March 29, 1904.

UNITED STATES PATENT OFFICE.

SAMUEL HARTMAN, OF HARTFORD, CONNECTICUT.

HOOK FOR SUPPORTING TENTING-CLOTH.

SPECIFICATION forming part of Letters Patent No. 755,658, dated March 29, 1904.

Application filed April 7, 1903. Serial No. 151,520. (No model.)

*To all whom it may concern:*

Be it known that I, SAMUEL HARTMAN, a citizen of the United States of America, residing at Hartford, in the county of Hartford and State of Connecticut, have invented certain new and useful Improvements in Hooks for Supporting Tenting-Cloth, of which the following is a specification.

The object of the invention is to provide a device of the class specified having features of novelty and advantage.

The figure shows a tobacco-hook made according to my invention in position for use.

Referring to the drawing, $a$ denotes a stringer. $b$ denotes the shank of the hook, which is driven into the stringer up to the shoulder $c$. $d$ denotes the arms on the hook proper, which branch out from the shank, curve downwardly, then in toward the shank, and slightly upward, as indicated at $e$. The shank projects slightly above the branching arms of the hook, forming a boss $g$, by means of which the hook may be driven into the stringer without danger of breaking the arms $d$. It will be noted that when the shank is driven into the stringer up to the shoulder $c$ a sufficient clearance is left between the lower turn of the hook and the stringer to permit of the insertion of the cloth. $k$ denotes the cloth held by the hook.

The manner of use of this hook will be clear to all persons versed in the growing of tobacco or any fruit or vegetable under cover. The field is divided off into sections by parallel rows of stringers, and these hooks are driven into the stringers at proper intervals. The cloth is then hooked under one hook and stretched across to a hook on the next stringer, and in this manner the whole field is covered.

I claim as my invention—

1. A hook of the type set forth comprising a shank formed with a shoulder, of a plurality of branch arms formed integral with said shank and being bent downwardly, then in and up to form cloth-receiving hooks, the lower portion of said hook being arranged above the shoulder of said shank, substantially as described.

2. A device of the type set forth comprising a shank formed with a shoulder, downturned integral-hooked branch arms formed integral with said shank above said shoulder, the lowermost portions of said branch arms lying in a plane above said shoulder, and a boss formed integral with said shank, and extended above said branch arms.

In testimony whereof I affix my signature in presence of two witnesses.

SAMUEL HARTMAN.

Witnesses:
H. E. HART,
D. S. KREIMENDAHL.